United States Patent [19]
Moon

[11] Patent Number: 5,982,560
[45] Date of Patent: Nov. 9, 1999

[54] COMPACT ZOOM LENS SYSTEM

[75] Inventor: Il-Choon Moon, Changwon-si, Rep. of Korea

[73] Assignee: Samsung Aerospace Industries, Ltd., Kyngsangnam-do, Rep. of Korea

[21] Appl. No.: 09/113,326

[22] Filed: Jul. 10, 1998

[30] Foreign Application Priority Data

Jul. 11, 1997 [KR] Rep. of Korea ........................ 97-32356

[51] Int. Cl.⁶ .............................. G02B 15/14; G02B 3/02
[52] U.S. Cl. ............................................ 359/692; 359/714
[58] Field of Search .................................. 359/691, 692, 359/714, 763, 764

[56] References Cited

U.S. PATENT DOCUMENTS

| | | | |
|---|---|---|---|
| 4,772,106 | 9/1988 | Ogata et al. | 350/427 |
| 5,011,272 | 4/1991 | Nakayama | 350/427 |
| 5,327,290 | 7/1994 | Fukushima et al. | 359/692 |
| 5,617,253 | 4/1997 | Kang | 359/692 |
| 5,636,061 | 6/1997 | Kang | 359/692 |
| 5,726,811 | 3/1998 | Kang et al. | 359/692 |
| 5,786,945 | 7/1998 | Aoki | 359/692 |
| 5,798,873 | 8/1998 | Hoshi et al. | 359/692 |

FOREIGN PATENT DOCUMENTS

| | | |
|---|---|---|
| 5-11181 | 5/1993 | Japan . |
| 5-113537 | 5/1993 | Japan . |
| 8-29683 | 8/1996 | Japan . |
| 8-50243 | 8/1996 | Japan . |
| 8-76014 | 8/1996 | Japan . |

OTHER PUBLICATIONS

H. Masumoto, "Development for Zoom Lens for Camera and Technical Topics" in International Optical Design Conference 1998, Leo R. Gardner, Kevin B. Thompson, Editors, Proceedings of SPIE vol. 3482. pp. 202–212 (Jun. 1998).

*Primary Examiner*—Georgia Epps
*Assistant Examiner*—David N. Spector
*Attorney, Agent, or Firm*—Finnegan, Henderson, Farabow, Garrett & Dunner, L.L.P.

[57] ABSTRACT

A compact zoom lens system includes a positive first lens group and a negative second lens group. The first lens group includes a first positive lens, a second negative biconcave lens and a third positive biconvex lens. The second lens group includes a fourth positive meniscus lens with the concave surfaces of the lens oriented towards the object side and a fifth negative meniscus lens with the concave surfaces of the lens oriented towards the object side. The zoom lens system satisfies the following conditions:

$0.40 < f1/f_W < 0.60$ where f1 represents a focal length of the first lens, and $f_W$ represents a focal length of the zoom lens system at a wide angle position.

11 Claims, 7 Drawing Sheets

Wide Angle Position

Telephoto Position

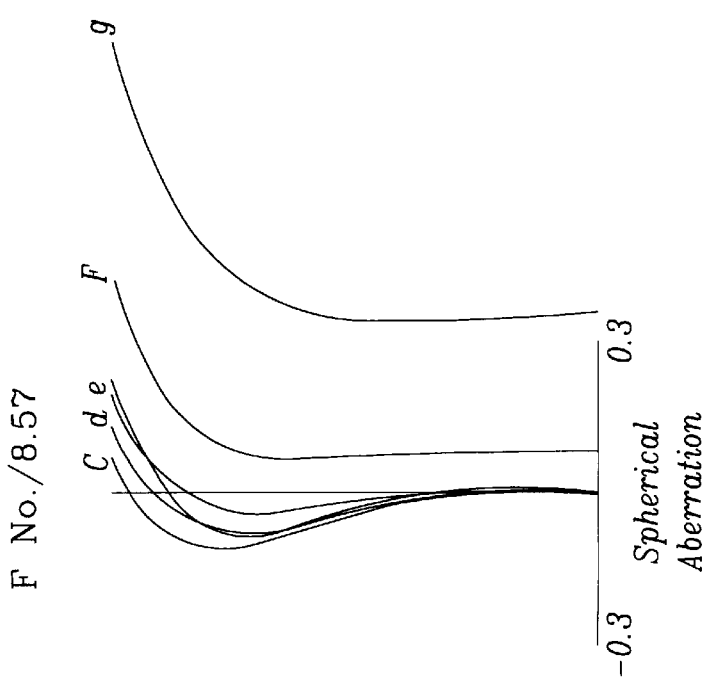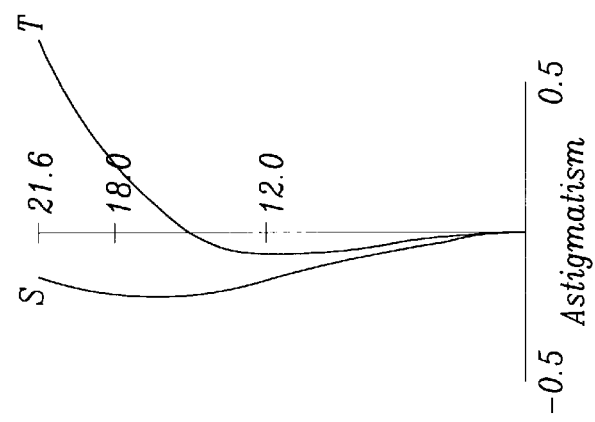

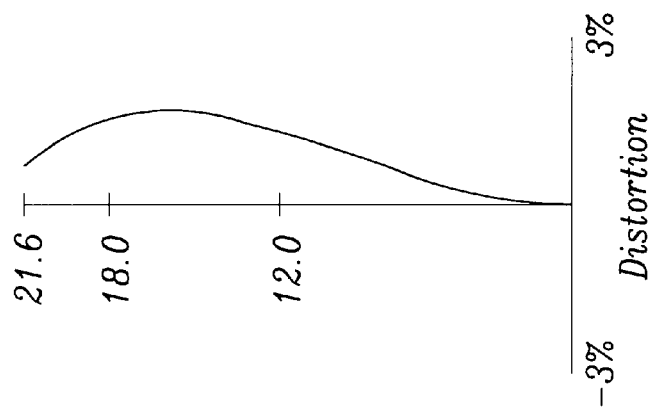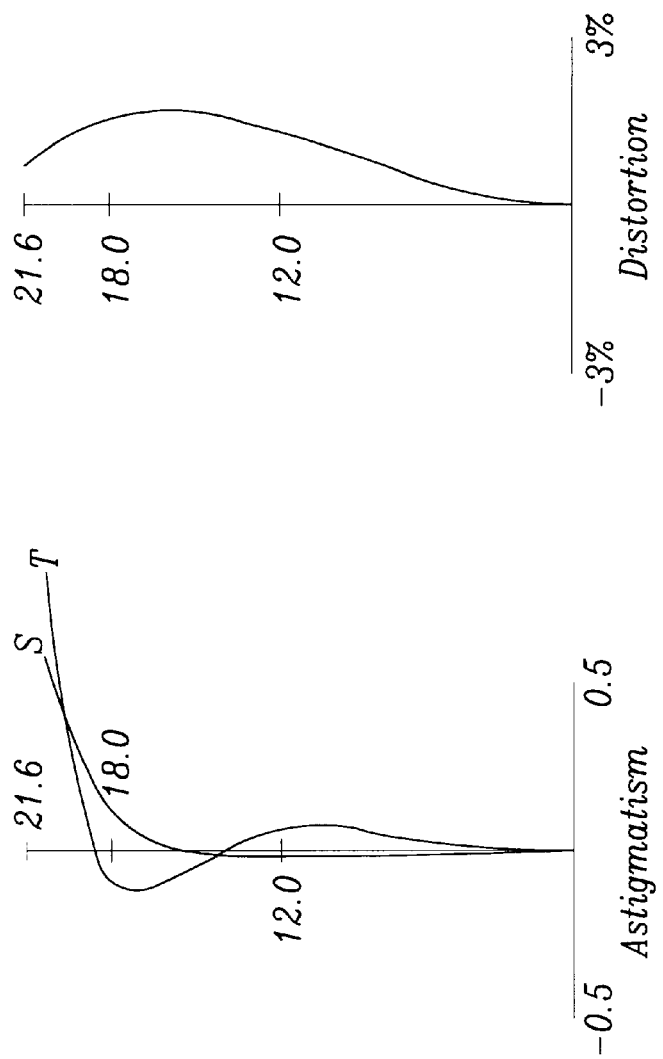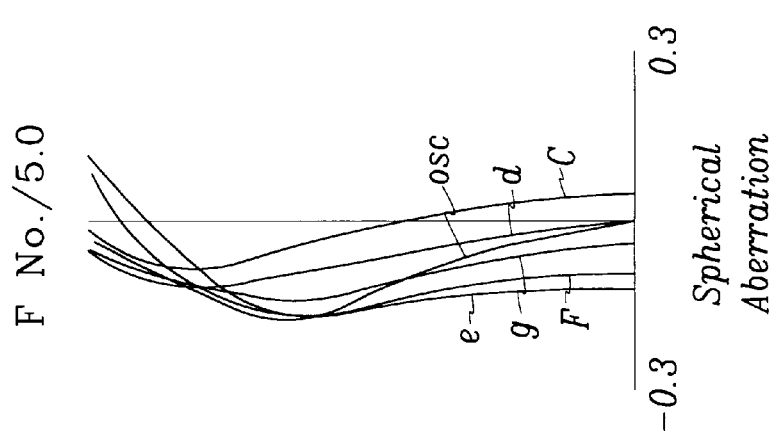

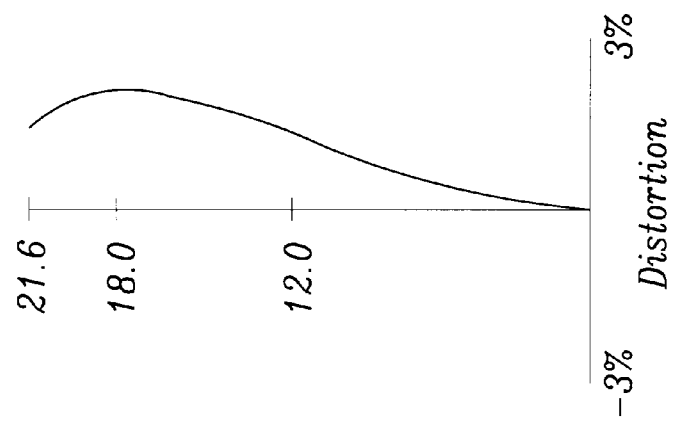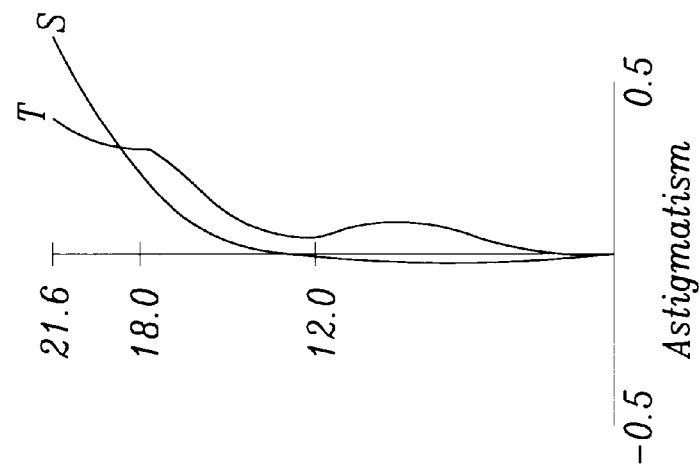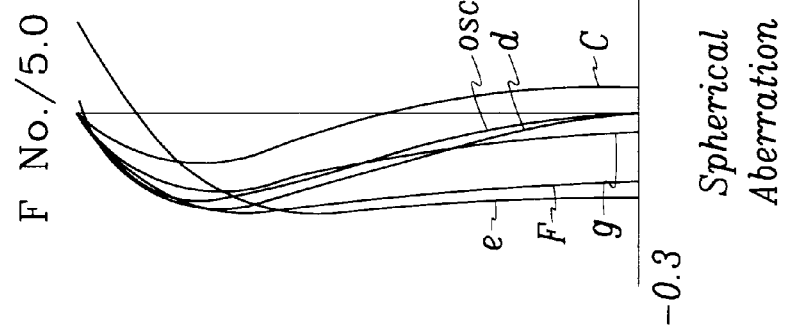

COMPACT ZOOM LENS SYSTEM

BACKGROUND OF THE INVENTION

1. Field of the Invention

The present invention relates to a zoom lens system, and more particularly, to a compact zoom lens system having two lens groups for a camera.

2. Description of the Related Art

A compact camera generally requires a compact zoom lens system. A zoom lens system using two lens groups is shown in Japanese Laid-open Patent Publications Nos. Hei 8-29863, Hei 5-11181, Hei 8-76014, Hei 8-50243 and Hei 5-113537, and U.S. Pat. Nos. 5,327,290 and 4,772,106.

Japanese Publication No. Hei 8-29863 uses two lens groups having five lenses, has a zooming ratio of about 1.5, and a focal length of 38–58 mm. This system uses an aspherical lens made of glass material, and has the disadvantage of a slow lens (an overly large minimum f- number) U.S. Pat. No. 4,772,106 has a zooming ratio lower than 1.5.

Japanese Publication No. Hei 5-11181 has a zooming ratio of about 1.54 and uses glass lenses. Japanese Publication Nos. Hei 8-76014, Hei 8-50243 and Hei 5-113537 and U.S. Pat. No. 5,327,290 use more than two aspherical lenses to obtain a zooming ratio of about 2, making manufacturing costs higher.

SUMMARY OF THE INVENTION

The advantages and purpose of the invention will be set forth in part in the description which follows, and in part will be obvious from the description, or may be learned by practice of the invention. The advantages and purpose of the invention will be realized and attained by the elements and combinations particularly pointed out in the appended claims.

To attain the advantages and in accordance with the purpose of the invention, as embodied and broadly described herein, the invention comprises a compact zoom lens system comprising a first compound lens group and a second compound lens group. The first compound lens group, at the object side of the system, has a positive refractive power and comprises first, second, and third lenses. The first lens has a positive refractive power and a convex surface facing the object side. The second lens is a biconcave lens and has a negative refractive power. The third lens is a biconvex lens and has a positive refractive power. The second compound lens group, disposed on an image side of the system, has fourth and fifth lenses and a negative refractive power. The fourth lens in the second compound lens group is a meniscus lens having a positive refractive power. The concave surface of the fourth lens faces the object side. The fifth lens is a meniscus lens having a negative refractive power. The concave surface of the fifth lens faces the object side.

The fourth meniscus lens in the second compound lens group is made of plastic material and has at least one aspherical surface. The first compound lens group is movable toward an object, and the second compound lens group is movable toward the first compound lens group when a magnification changes. The magnification of the system is changed by varying a distance between the first lens group and the second lens group, wherein the following condition is satisfied:

$0.40 < f1/f_W < 0.60$ where f1 represents a focal length of the first lens, and $f_W$ represents a focal length of the zoom lens system at a wide angle position. The zooming ratio of the compact zoom lens system is about 2.0.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings:

FIGS. 3A to 3C show the aberration curves of a zoom lens system at a telephoto position, in accordance with an embodiment of the present invention;

FIGS. 4A to 4C show the aberration curves of a zoom lens system at a wide angle position, in accordance with another embodiment of the present invention;

FIGS. 6A to 6C show the aberration curves of a zoom lens system at a wide angle position, in accordance with a third embodiment of the present invention.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1A:
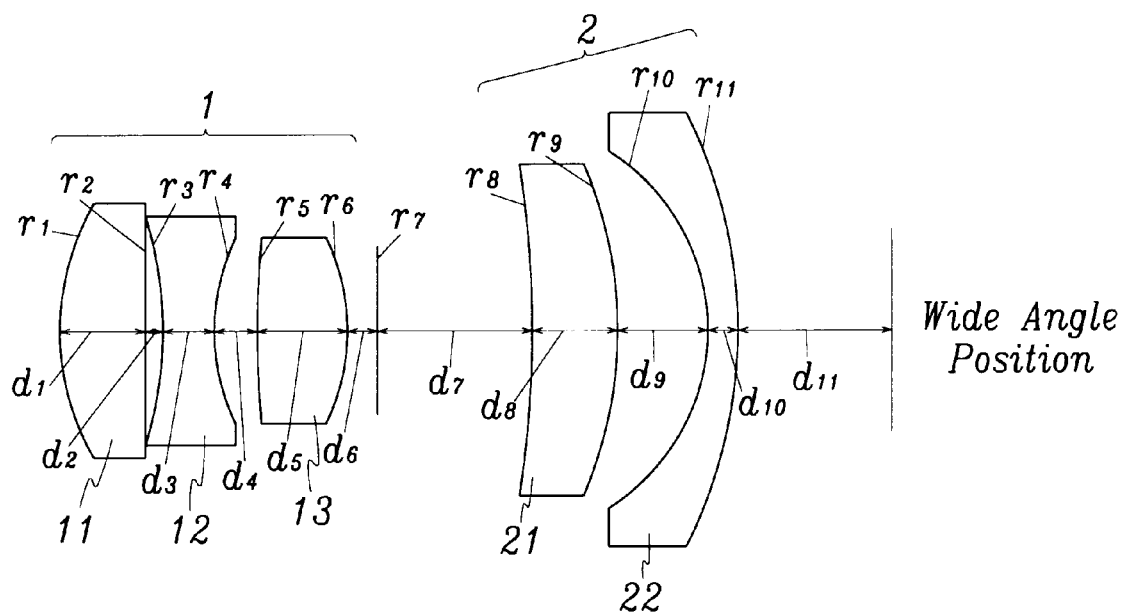
FIGS. 1A and 1B are schematic side views of a zoom lens system constructed in accordance with the present invention.
Figure 1B:
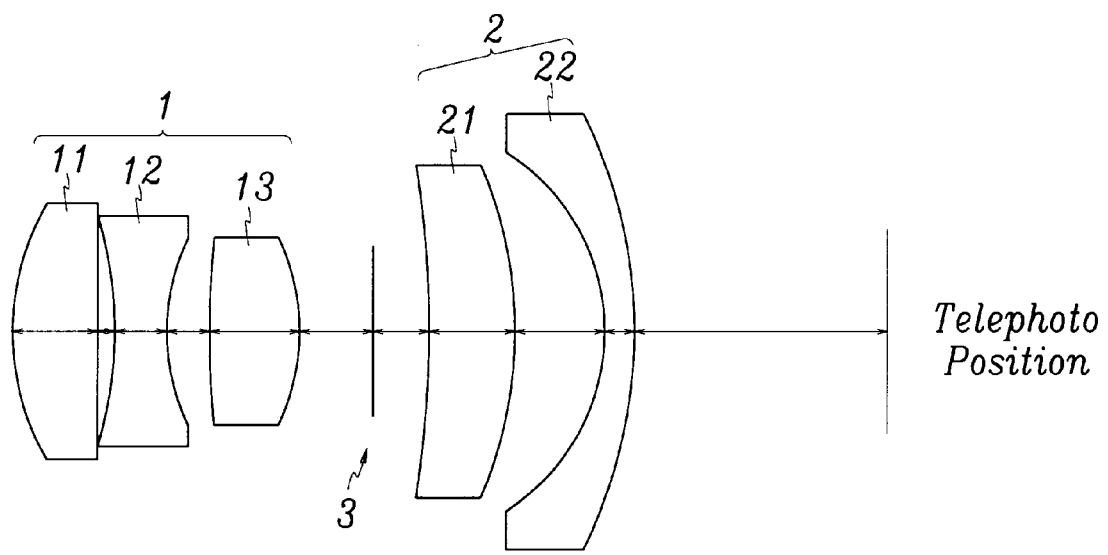

An exemplary embodiment of the compact zoom lens system of the present invention is shown in FIGS. 1A and 1B. The zoom lens system comprises a first lens group 1, a second lens group 2, and an aperture stop 3 between the two lens groups 1 and 2.

The first lens group 1, having an overall positive refractive power, includes three lenses. A first lens 11 has a positive refractive power and has a convex surface r1 facing an object side of the system. A second lens 12 is a negative biconcave lens. A third lens 13 is a positive biconvex lens.

The second lens group 2, having an overall negative refractive power, includes two lenses. A fourth lens 21 is a positive meniscus lens having a concave surface r8 facing the object side. The fourth meniscus lens 21 is made of plastic material. The concave surface r8 of the fourth meniscus lens 21 is preferably an aspherical lens surface. A fifth lens 22 is a negative meniscus lens having a concave surface r10 facing the object side.

When zooming from a wide angle position to a telephoto position, the first lens group 1 is movable toward an object, and the second lens group 2 is movable toward the first compound lens group when a magnification changes. Therefore, the distance between the two lens groups 1 and 2 decreases. A zoom lens system according to the present invention satisfies the following conditions:

(1) $0.40 < f1/f_W < 0.60$ (2) $0.30 < (D_{WL} - D_W)/f_W < 0.55$ (3) $0.20 < (D_{TL} - D_T)/f_T < 0.30$ (4) $1.10 < D_{WL}/L_Y < 1.55$ (5) $2.00 < f_{FR}/f_{bw} < 2.70$ (6) $0.65 < D_{WL}/f_W < 0.85$ (7) $0.20 < |f2/f_W| < 0.30$, $f2 < 0$ (8) $0.60 < f_{FR}/f_W < 0.70$ (9) $0.20 < D_W/f_W < 0.35$

(10) $1.65 < n5 < 1.80$ where:

f1 represents the focal length of the first lens 11;

$f_W$ represents the focal length of the zoom lens system at a wide angle position;

$D_{WL}$ represents the distance between a surface r1 of the first lens 11 element facing the object side and a surface r11 of the fifth lens 22 facing an image side of the compact zoom lens system, at a wide angle position;

$D_W$ represents the distance between a surface r6 of the third lens 13 facing the image side and a surface r8 of the fourth lens 21 facing the object side, at a wide angle position;

$D_{TL}$ represents the distance between the surface r1 of the first lens 11 facing the object side and the surface r11 of the fifth lens 22 facing an image side, at a telephoto position;

$D_T$ represents the distance between a surface r6 of the third lens 13 facing the image side and a surface r8 of the fourth lens 21 facing the object side, at a telephoto position;

$F_T$ represents the focal length of the zoom lens system at a telephoto position;

$L_Y$ represents a maximum image height;

$f_{FR}$ represents the focal length of the first lens group 1;

$f_{bw}$ represents the back focal length of the zoom lens system at a wide angle position;

f2 represents the focal length of the second lens group 2; and n5 represents the refractive index of the fifth lens 22.

Condition (1) relates to the focal length of the first lens 11. If the lower limit of condition (1) is violated, the positive refractive power of the first lens 11 increases. This causes a principal point of the first lens group 1 to be positioned outside of the second lens group 2, making it difficult to obtain a high zooming ratio. If the upper limit of condition (1) is violated, the refractive power of the first lens 11 decreases, requiring a negative refractive power of the system to decrease to eliminate spherical aberration. As a result, positive distortion will increase at a wide angle position and coma also will increase.

Conditions (2) and (3) relate to a total length of the system. If these two conditions are satisfied, the distance between the first lens group 1 and the second lens group 2 decreases to the shortest distance possible, thereby decreasing the total length of the system. Therefore, the camera utilizing the present invention may be made compact and more portable.

Condition (4) relates to the compactness of the system, defining a range of the distance between the surface r1 of the first lens 11 facing the object side and the surface r11 of the fifth lens 22 facing the image side at a wide angle position in terms of the maximum image height. If the lower limit of condition (4) is violated, the length of the first lens group 1 decreases, preventing negative distortion. Negative distortion from the first lens group 1 compensates positive distortion generated by the second lens group 2. If the upper limit of condition (4) is violated, the distance $D_{WL}$ will increase at a wide angle position, making it difficult to make the system compact.

Condition (5) also relates to the compactness of the system. If the lower limit of condition (5) is violated, a back focal length of the system shortens and an angle between an exit ray of the system and an optic axis becomes larger. This, in turn, requires an increase in the diameter, measured perpendicular to the optic axis of the system, of the fifth lens 22 of the second lens group 2. If the upper limit of condition (5) is violated, a back focal length of the system becomes too long to eliminate coma and distortion occurring at a wide angle position.

Condition (6) relates to a lens thickness of the first lens 11 to the fifth lens 22 on the optic axis at a wide angle position. If the lower limit of condition (6) is violated, a distance between the first lens group 1 and the second lens group 2 is not wide enough to obtain a high zooming ratio. If the upper limit of condition (6) is violated, the total length of the system will increase at a wide angle position.

Condition (7) relates to a focal length of the second lens 12 of the first lens group 1. If the lower limit of condition (7) is violated, the negative refractive power of the first lens groups 1 increases. As a result, chromatic aberration is overly corrected. On the contrary, If the upper limit of condition (7) is violated, the negative refractive power of the first lens group 1 becomes too small to compensate for chromatic aberration.

Condition (8) relates to a refractive power of the first lens group 1. If the lower limit of condition (8) is violated, it is easy to compensate for aberrations. However, the focal length change of the system will decrease when the distance between the first lens group 1 and the second lens group 2 decreases during zooming. Therefore, it is difficult to obtain a compact zoom lens system because the distance between the first lens group 1 and the second lens group 2 changes rapidly during zooming in order to obtain a zooming ratio of about 2.0. If the upper limit of condition (8) is violated, it is easy to obtain a compact zoom lens system. However, the refractive power becomes stronger, making it difficult to compensate for spherical aberration and coma when zooming.

Condition (9) defines the distance between the first lens group 1 and the second lens group 2. If the lower limit of condition (9) is violated, the back focal length of the system becomes short at a wide angle position, making the diameter, measured perpendicular to the optic axis of the system, of the fifth lens 22 in the second lens group 2 larger. On the contrary, if the upper limit of condition (9) is violated, the diameters of the lenses in the first lens group become larger, thereby increasing the size of the system.

Condition (10) relates to materials of the fifth lens (22) in the second lens group 2, for eliminating field curvature. If the lower limit of condition (10) is violated, a positive Petzval's sum will increase. As a result, field curvature is overly corrected. On the contrary, if the upper limit of condition (10) is violated, the cost of materials increases.

The data according to the preferred embodiments of the present invention are shown in the tables below. In the tables, r represents a radius of curvature, d represents a distance between lenses or thickness of a lens, n represents a refractive index for d-line, and v represents an Abbe number of a lens. In each of those tables, all units of length are denominated in millimeters.

The aspherical coefficients set forth in the following tables are for use in the following equation:

$$Z = \frac{Cy^2}{1 + (1 - (K+1)C^2y^2)^{1/2}} + A_4 y^4 + A_6 y^6 + A_8 y^8 + A_{10} y^{10}$$

where Z is the surface sag at a distance y from the optical axis of the system;

C is the base curvature of the surface at the optical axis;

K is a conic constant; and $A_4$, $A_6$, $A_8$, and $A_{10}$ are aspherical coefficients Data for one preferred embodiment of the present invention are shown in Table 1, where the effective focal length of the first preferred embodiment ranges from 39.30 mm at a wide angle position to 67.39 mm at a telephoto position, and the F number ranges from 5.0 to 8.57.

TABLE 1

| Surface No. | Radius of Curvature (R) | Distance (d) | Refractive Index (n) | Abbe Number (v) |
|---|---|---|---|---|
| 1 | 12.000 | 2.02 | 1.58144 | 40.85 |
| 2 | −218.457 | 0.46 | | |
| 3 | −19.368 | 3.20 | 1.74002 | 28.16 |
| 4 | 12.909 | 1.06 | | |
| 5 | 24.429 | 3.06 | 1.65128 | 38.32 |
| 6 | −12.960 | 1.20 | | |
| 7 | Aperture Stop | 10.20–2.29 | | |
| 8* | −29.500 | 2.37 | 1.59048 | 39.69 |
| 9 | −20.259 | 4.13 | | |
| 10 | −9.944 | 1.20 | 1.78590 | 43.93 |
| 11 | −25.412 | 11.75–40.63 | | |

*represents an aspherical surface.

According to this embodiment of the present invention, the aspherical surfaces are described using the aspherical coefficients shown in Table 2.

TABLE 2

| | R8 |
|---|---|
| Conic Constant (K) | 0.2050659527990E + 01 |
| Aspherical Coefficient ($A_4$) | 0.7985411037183E − 04 |
| Aspherical Coefficient ($A_6$) | 0.9263736323726E − 06 |
| Aspherical Coefficient ($A_8$) | −0.1490839119865E − 08 |
| Aspherical Coefficient ($A_{10}$) | −0.4565479843378E − 11 |

Figure 2C:
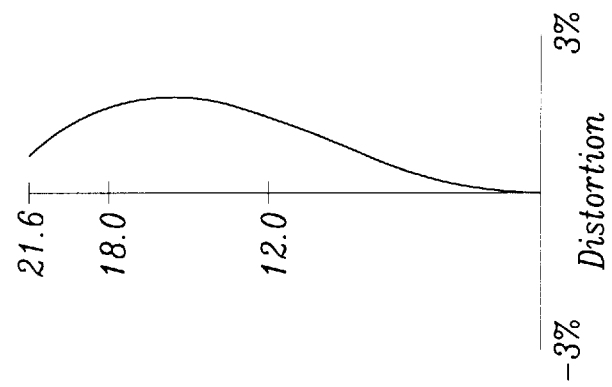
FIGS. 2A to 2C show the aberration curves of a zoom lens system at a wide angle position, in accordance with an embodiment of the present invention.
Figure 2B:
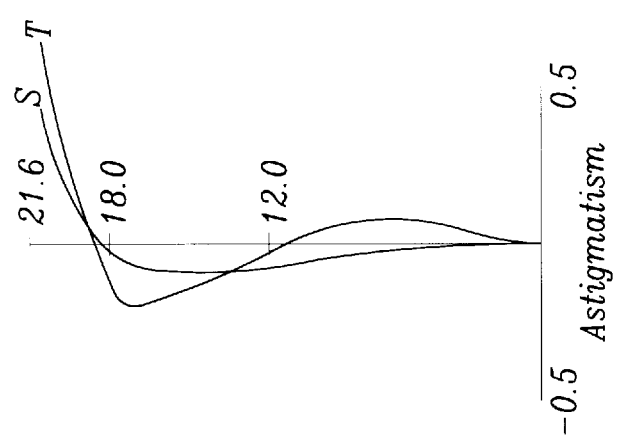
Figure 2A:
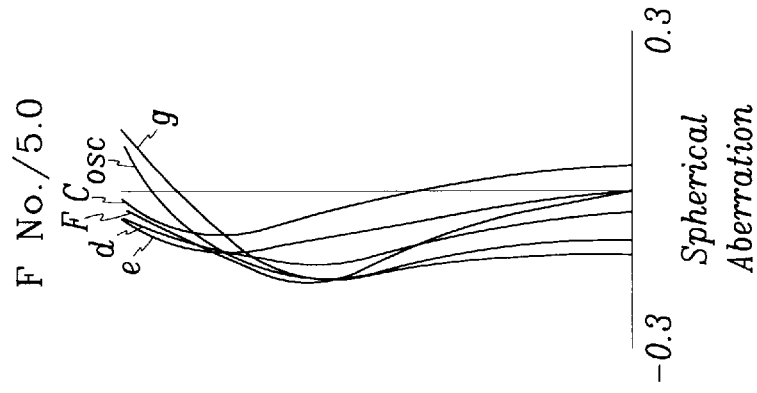

FIGS. 2A to 2C illustrate the aberration characteristics such as spherical aberration, astigmatism, and distortion, respectively, of this preferred embodiment at a wide angle position. FIGS. 3A to 3C illustrate the aberration characteristics of aberration, astigmatism and distortion, respectively, of this embodiment at a telephoto position.

Data for another preferred embodiment of the present invention are shown in Table 3, where the effective focal length of the first preferred embodiment ranges from 39.30 mm at a wide angle position to 67.41 mm at a telephoto position and the F number ranges from 5.0 to 8.57.

TABLE 3

| Surface No. | Radius of Curvature (R) | distance (d) | Refractive Index (n) | Abbe Number (v) |
|---|---|---|---|---|
| 1 | 11.652 | 2.08 | 1.57502 | 41.31 |
| 2 | −755.662 | 0.58 | | |
| 3 | −21.385 | 3.00 | 1.74002 | 28.16 |
| 4 | 11.756 | 1.05 | | |
| 5 | 20.989 | 4.20 | 1.65128 | 38.32 |

TABLE 3-continued

| Surface No. | Radius of Curvature (R) | distance (d) | Refractive Index (n) | Abbe Number (v) |
|---|---|---|---|---|
| 6 | −13.322 | 1.20 | | |
| 7 | Aperture Stop | 9.80–2.20 | | |
| 8* | −24.627 | 1.88 | 1.59048 | 39.69 |
| 9 | −18.761 | 4.41 | | |
| 10 | −9.769 | 1.20 | 1.78590 | 43.93 |
| 11 | −23.877 | 11.76–40.19 | | |

*represents an aspherical surface.

According to this of the present invention, the aspherical surfaces are described using the aspherical coefficients shown in Table 4.

TABLE 4

| | R8 |
|---|---|
| Conic Constant (K) | −0.1024952800516E + 02 |
| Aspherical Coefficient ($A_4$) | −0.5999599299883E − 05 |
| Aspherical Coefficient ($A_6$) | 0.8302845422245E − 06 |
| Aspherical Coefficient ($A_8$) | 0.1513660454089E − 07 |
| Aspherical Coefficient ($A_{10}$) | −0.2035438140845E − 09 |

Figure 5C:
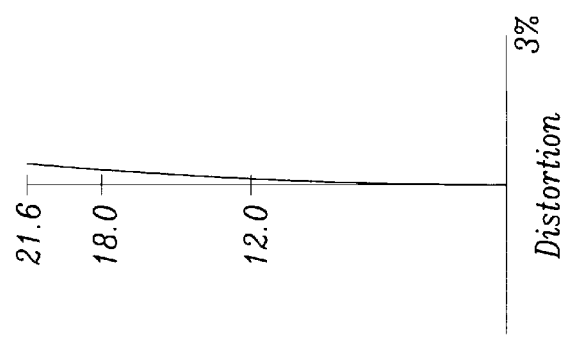
FIGS. 5A to 5C show the aberration curves of a zoom lens system at a telephoto position, in accordance with another embodiment of the present invention.
Figure 5B:
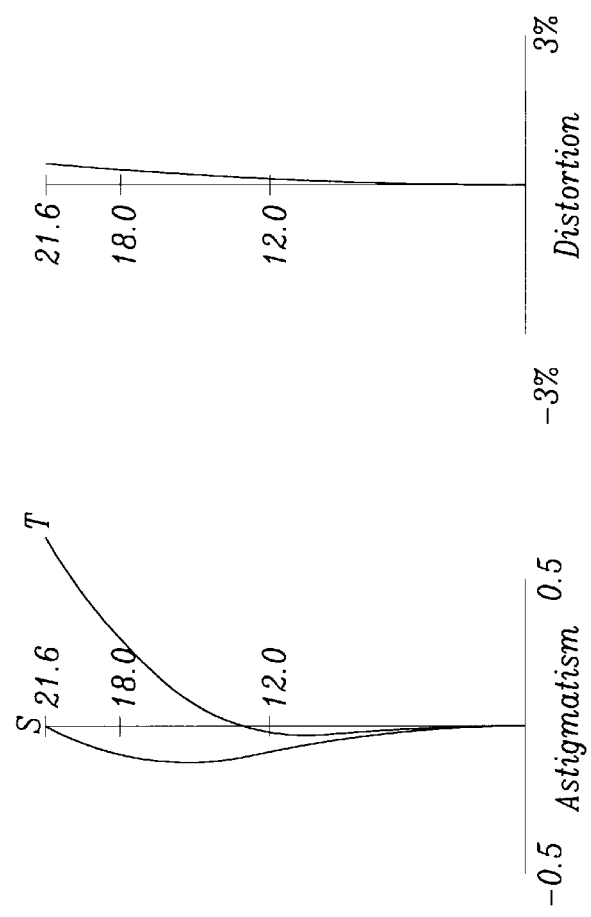
Figure 5A:
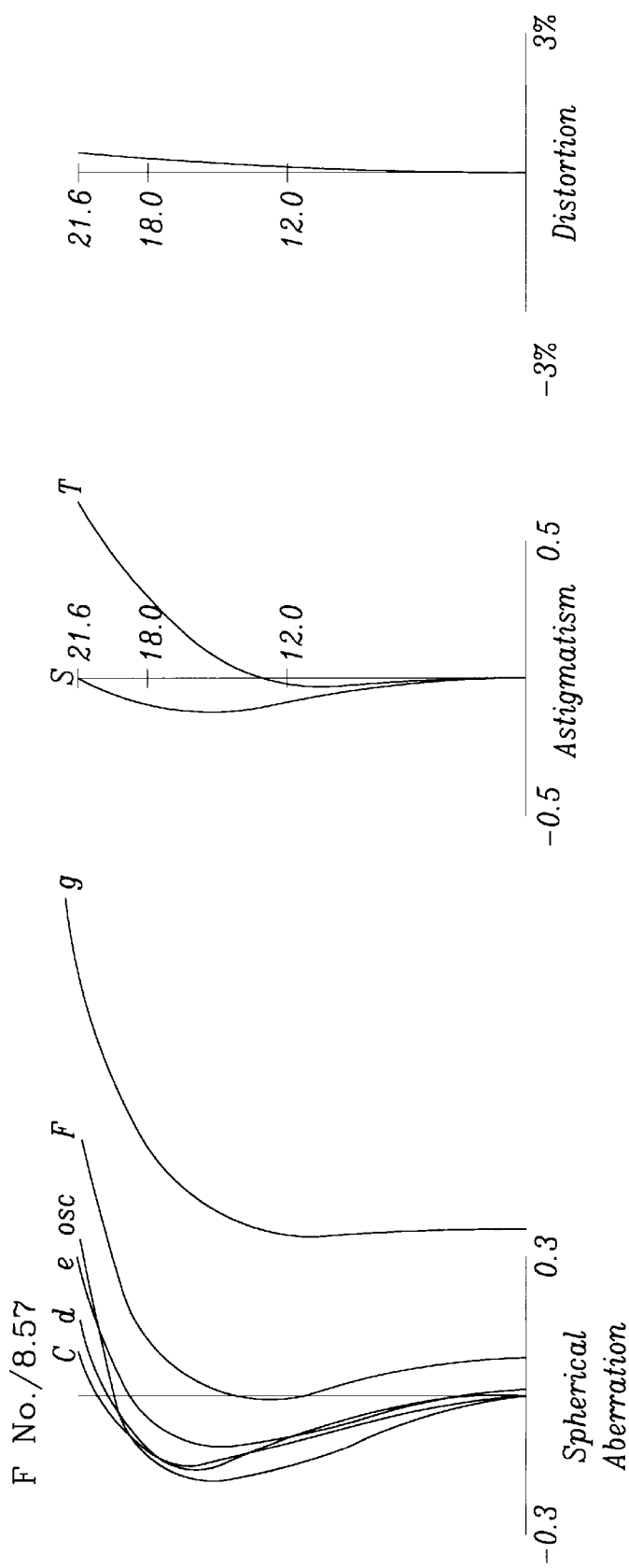

FIGS. 4A to 4C illustrate the aberration characteristics of spherical aberration, and distortion, respectively, of the preferred embodiment shown in Table 3 at a angle position. FIGS. 5A to 5C illustrate the aberration characteristics of aberration astigmatism, and distortion, respectively, of this embodiment at a telephoto position Data for a third preferred embodiment of the present invention are shown in Table 5, where the effective focal length of the third preferred embodiment ranges from 39.30 mm at a wide angle position to 67.00 mm at a telephoto position, and the F numbers ranges from 5.0 to 8.52.

TABLE 5

| Surface No. | Radius of Curvature (R) | distance (d) | Refractive Index (n) | Abbe Number (v) |
|---|---|---|---|---|
| 1 | 11.603 | 1.98 | 1.68893 | 31.18 |
| 2 | 208.814 | 0.51 | | |
| 3 | −24.508 | 2.02 | 1.80627 | 25.37 |
| 4 | 12.860 | 1.83 | | |
| 5 | 36.546 | 2.96 | 1.66755 | 41.93 |
| 6 | −13.503 | 1.20 | | |
| 7 | Aperture Stop | 11.25–2.20 | | |
| 8* | −26.773 | 3.00 | 1.59048 | 39.69 |
| 9 | −19.811 | 4.45 | | |
| 10 | −10.766 | 1.00 | 1.78831 | 47.39 |
| 11 | −25.908 | 10.87–40.83 | | |

*represents an aspherical surface.

According to the third preferred embodiment of the present invention, the aspherical surfaces are described using the aspherical coefficients shown in Table 6.

TABLE 6

| | R8 |
|---|---|
| Conic Constant (K) | −0.3268262375348E + 02 |
| Aspherical Coefficient ($A_4$) | −0.1489681955055E − 03 |
| Aspherical Coefficient ($A_6$) | 0.3902491517316E − 05 |
| Aspherical Coefficient ($A_8$) | −0.4526322383692E − 07 |
| Aspherical Coefficient ($A_{10}$) | −0.2786127340988E − 09 |

Figure 7C:
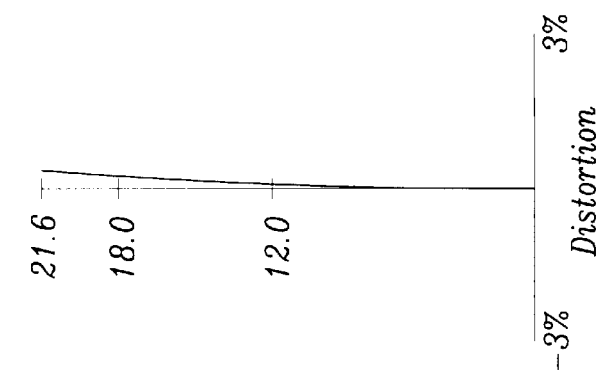
FIGS. 7A to 7C show the aberration curves of a zoom lens system at a telephoto position, in accordance with the third embodiment of the present invention.
Figure 7B:
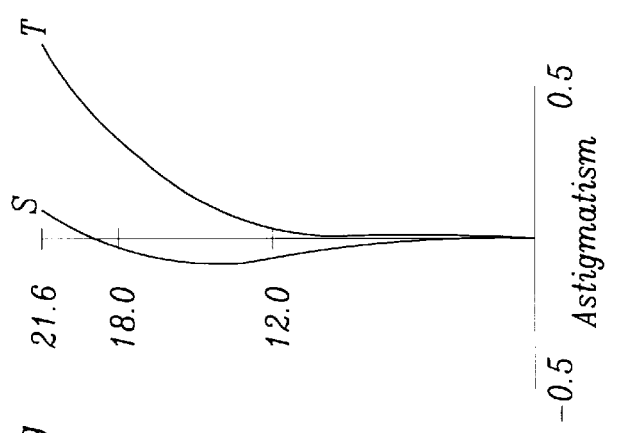
Figure 7A:
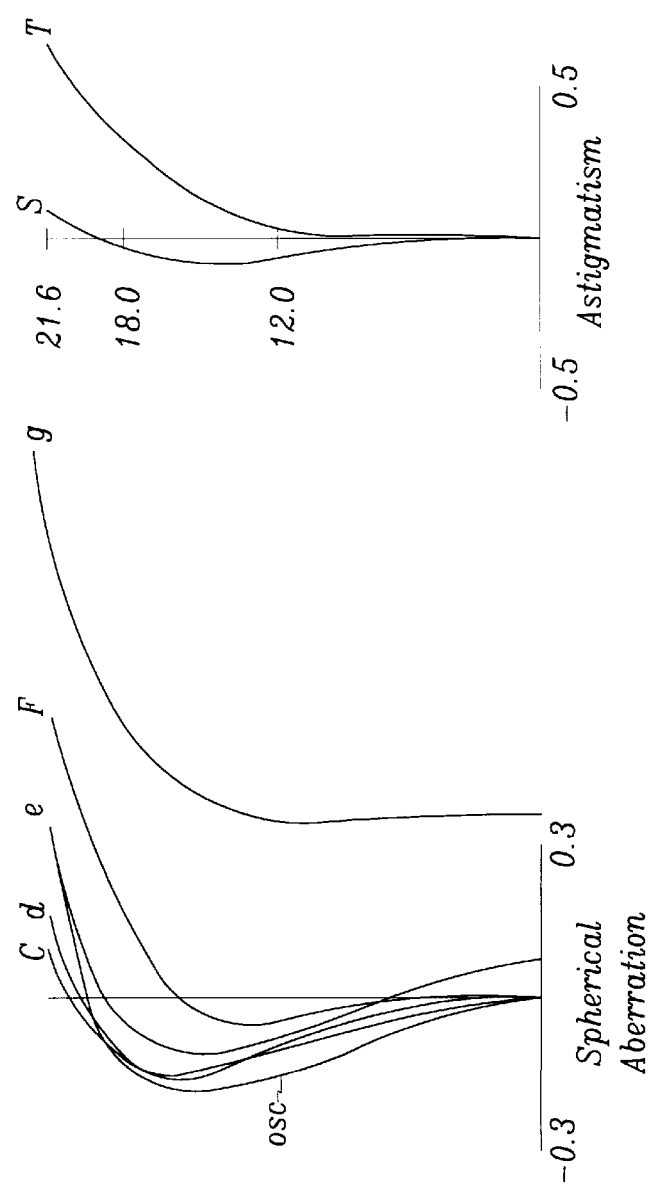

FIGS. 6A to 6C illustrate the aberration characteristics of spherical aberration, astigmatism and distortion, respectively, of the third preferred embodiment at a wide angle position. FIGS. 7A to 7C illustrate the aberration characteristics of aberration, astigmatism, and distortion, respectively, of the third preferred embodiment at a telephoto position.

The parameters of conditions (1) to (10) for the above embodiments are described in Table 7.

TABLE 7

| Parameter | First Embodiment | Second Embodiment | Third Embodiment |
|---|---|---|---|
| $f1/f_W$ | 0.493 | 0.508 | 0.452 |
| $(D_{WL} - D_W)/f_W$ | 0.420 | 0.468 | 0.452 |
| $(D_{TL} - D_T)/f_T$ | 0.260 | 0.273 | 0.265 |
| $D_{WL}/L_Y$ | 1.338 | 1.361 | 1.399 |
| $f_{FR}/f_{bw}$ | 2.291 | 2.263 | 2.595 |
| $D_{WL}/f_W$ | 0.736 | 0.748 | 0.769 |
| $|f2|/f_W$ | 0.257 | 0.251 | 0.260 |
| $f_{FR}/f_W$ | 0.685 | 0.677 | 0.718 |
| $D_W/f_W$ | 0.316 | 0.280 | 0.317 |
| $n5$ | 1.786 | 1.786 | 1.788 |

It will be apparent to those skilled in the art that various modifications and variations can be made to the system of the present invention without departing from the spirit and scope of the invention. The present invention covers the modifications and variations of this invention that come within the scope of the appended claims and their equivalents.

What is claimed is:

1. A compact zoom lens system having an object side and an image side, comprising:
   a first lens group disposed at the object side of the system and having a positive refractive power, the first lens group including:
   a first lens having a positive refractive power and a convex surface facing the object side, a second biconcave lens having a negative refractive power; and
   a third biconvex lens having a positive refractive power; and a second lens group having a negative refractive power, including:
   a fourth meniscus lens formed of a plastic material, the fourth meniscus lens having positive refractive power, at least one aspherical surface, and a concave surface facing the object side; and
   a fifth meniscus lens having a negative refractive power and a concave surface facing the object side,
   wherein, because the first lens group is movable toward on object and the second lens group is movable toward the first lens group during zooming from a wide angle position to a telephoto position, a distance between the first lens group and the second lens group decreases during zooming from a wide angle position to a telephoto position and the zoom lens system satisfies the following condition:
   $0.40 < f1/f_W < 0.60$
   where f1 represents a focal length of the first lens and $f_W$ represents a focal length of the zoom lens system at a wide angle position.

2. A compact zoom lens system of claim 1, wherein the concave surface of the fourth lens of the second lens group is an aspherical lens surface.

3. A compact zoom lens system of claim 1, further satisfying the following condition:

$0.30 < (D_{WL} - D_W)/f_W < 0.55$ where $D_{WL}$ represents the distance between the surface of the first lens facing the object side and a surface of the fifth lens facing the image side, at a wide angle position, and $D_W$ represents a distance between a surface of the first lens facing the image side and the surface of the second lens facing the object side, at a wide angle position.

4. A compact zoom lens system of claim 1, further satisfying the following condition:

$0.20 < (D_{TL} - D_T)/f_T < 0.30$ where $D_{TL}$ represents the distance between the surface of the first lens facing the object side and the surface of the fifth lens facing an image side, at a telephoto position, $D_T$ represents a distance between the surface of the first lens facing the image side and the surface of the second lens facing the object side, at a telephoto position, and $f_T$ represents a focal length of the zoom lens system at a telephoto position.

5. A compact zoom lens system of claim 1, further satisfying the following condition:

$1.10 < D_{WL}/L_Y < 1.55$ where $D_{WL}$ represents the distance between the surface of the first lens facing the object side and the surface of the fifth lens facing the image side, at a wide angle position, and $L_Y$ represents a maximum image height.

6. A compact zoom lens system of claim 1, further satisfying the following condition:

$2.00 < f_{FR}/f_{bw} < 2.70$ where $f_{FR}$ represents a focal length of the first lens group, and $f_{bw}$ represents the back focal length of the zoom lens system at a wide angle position.

7. A compact zoom lens system of claim 1, further satisfying the following condition:

$0.65 < D_{WL}/f_W < 0.85$ where $D_{WL}$ represents the distance between the surface of the first lens facing the object side and the surface of the fifth lens facing the image side, at a wide angle position.

8. A compact zoom lens system of claim 1, further satisfying the following condition:

$0.20 < |f2|/f_W < 0.30, f2 < 0$ where f2 represents a focal length of the second lens group.

9. A compact zoom lens system of claim 1, further satisfying the following condition:

$0.60 < f_{FR}/f_W < 0.70$ where $f_{FR}$ represents a focal length of the first lens group.

10. A compact zoom lens system of claim 1, further satisfying the following condition:

$0.20 < D_W/f_W < 0.35$ where $D_W$ represents the distance between the surface of the first lens facing the image side and the surface of the second lens facing the object side, at a wide angle position.

11. A compact zoom lens system of claim 1, further satisfying the following condition:

$1.65 < n5 < 1.80$ where n5 represents the refractive index of the fifth lens.

* * * * *